Oct. 18, 1960 GUY JR. PRICHARD 2,956,779
POWER-SCOOP PULLING MECHANISM
Filed June 30, 1958 5 Sheets-Sheet 1

INVENTOR.
GUY JR. PRICHARD,
BY
Harold B. Hood
ATTORNEY.

INVENTOR.
GUY JR. PRICHARD,
BY
Harold B. Hood
ATTORNEY.

Oct. 18, 1960     GUY JR. PRICHARD     2,956,779
POWER-SCOOP PULLING MECHANISM
Filed June 30, 1958     5 Sheets-Sheet 4

INVENTOR.
GUY JR. PRICHARD
BY
Harold B. Hood
ATTORNEY.

United States Patent Office 2,956,779
Patented Oct. 18, 1960

2,956,779

POWER-SCOOP PULLING MECHANISM

Guy Jr. Prichard, Enterprise, Kans., assignor to The J. B. Ehrsam & Sons Manufacturing Company, Enterprise, Kans., a corporation of Kansas Filed June 30, 1958, Ser. No. 745,489

13 Claims. (Cl. 254—187)

The present invention relates to a power scoop-pulling mechanism which finds its primary utility in unloading grain, or similar discrete, fluent material, from storage spaces having relatively restricted exit openings, of which a railroad box car is an illustrative example.

Numerous more or less complicated devices have been conceived in the past for accomplishing this general objective, but those which are simple enough in construction to be commercially feasible have invariably required attendance and manipulation by two or more workers, while those which have been capable of manipulation by a single operator have been so complicated and expensive as to be prohibitive for the use for which they are intended.

The primary object of the present invention is to provide power means for dragging a scoop from any selected position in an enclosure to a preselected point closely adjacent the restricted exit from that chamber, the scoop-dragging, power-driven mechanism being of such character that a single operator, working in the enclosure, can readily move the scoop to any desired point in the enclosure, then activate the power-driven mechanism to drag the scoop from such selected position to the exit opening from the chamber, while manually guiding the scoop along any desired path within the chamber, and be assured that the power-driven drag on the scoop will be released and discontinued when the scoop attains a preselected position so close to the exit that the material entrained with the scoop will be largely, if not entirely, discharged through the exit opening before the scoop stops.

A further object of the invention is to provide, in a strand-winding, power-driven mechanism, control means of such character that the strand may be easily unwound from a winding drum, by the application of manual force thereto, but will be powerfully and positively rewound, by automatically-acting means whenever slack is formed in the strand after a portion of the strand has so been unwound. A further object of the invention is to provide, in such control means, means whereby the power winding will be automatically discontinued when a predetermined point on the strand reaches a preselected position relative to the winding drum.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
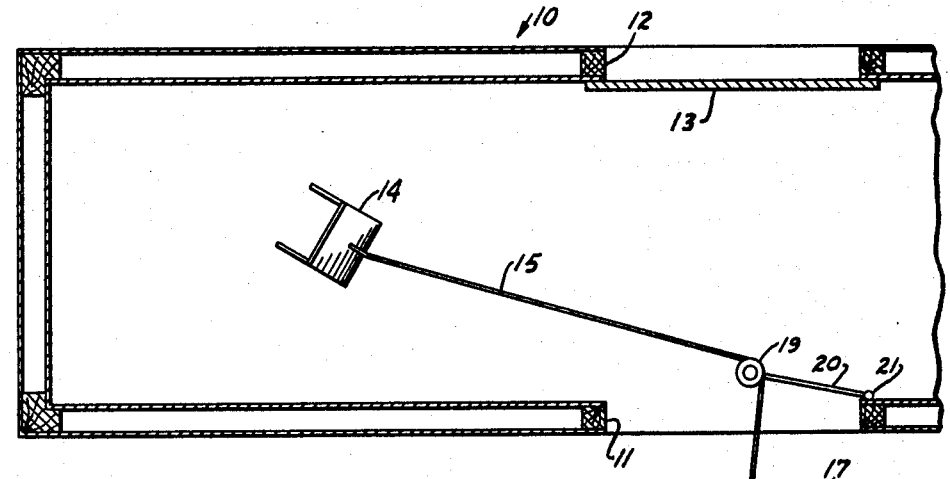
Fig. 1 is a somewhat diagrammatic representation of a system constructed in accordance with the present invention in use in a railroad box car shown in fragmentary horizontal section.

Referring more particularly to the drawings, in Fig. 1 I have illustrated a fragment of a conventional railroad box car 10 having doorways 11 and 12 substantially midway between its ends on its opposite sides. Conventionally, when grain or similar discrete, fluent solid material is loaded into such a car, temporary walls such as indicated at 13 are used to supplement the conventional car doors (not shown). When a car is to be unloaded, it is usually moved onto a track section adjacent which is disposed a storage pit or the mouth of a conveyor (not shown) and one of the doorways is located in such registry with the pit or conveyor mouth that material, falling from such doorway, will flow into the pit or conveyor mouth. When the conventional door is opened and the temporary wall 13 is removed from the corresponding doorway, that portion of the material which is located closely adjacent the doorway will immediately flow out; leaving the major portion of the load undisturbed in the opposite end portions of the car. While the remaining material may, of course, be manually shoveled from the car, the cost of such an operation, at present day labor rates and under current demurrage conditions would be prohibitive; and it is essential, therefore, to provide some sort of means for quickly shifting the material from the car end sections to and through the opened doorway.

According to the present invention, a drag scoop 14 is secured to the free end of a cable or similar strand 15, a portion of the length of which strand is wound upon a drum 16 mounted for opposite rotation upon a relatively fixed axis. As shown, the drum constitutes an element of a power assembly 17 which, in the illustrated embodiment of the invention, is stationarily mounted at an unloading platform, and the cable runs over a sheave 18, similarly located on a fixed axis. It will be clear, of course, that the entire assembly 17, hereafter to be described, could be mounted upon a shiftable platform, if that should appear to be desirable.

From the sheave 18, the strand 15 runs over a sheave 19 which, as shown, may be carried at the distal end of a link 20 which is preferably pivotally mounted upon a suitable anchorage 21 in the car, so that the cable may be kept from scraping against the edges of the car doorway as the scoop 14 is moved to and away from various positions within the car. Other means for preventing such scraping of the strand may be provided without departing from the spirit of my invention.

It is desirable that an operator, working within the car, may manually drag the scoop 14 away from the sheave 19 to any desired point within the car and then, without the necessity of running to the station 17 and without the assistance of an operator at the station 17, may cause the power mechanism to wind the strand 15 onto the drum 16 to drag the scoop toward the doorway 11. It is also desirable that the winding mechanism may be caused to discontinue such dragging of the scoop when the scoop has reached the doorway, and that such discontinuation shall be entirely automatic. Those desirable results are accomplished through the mechanism now to be described.

Within the housing, illustrated in Fig. 1, at the station 17, a reversible electric motor 22 is supported. The spindle 23 of the motor 22 carries suitable wheel means 24 which, through suitable endless means, drives similar wheel means 25 on the shaft 26 of a gear reducer within the housing. As shown, the wheel means 24 and 25 comprise plural-groove V-pulleys, and the connecting endless means used with such wheel means will, of course, be plural V-belts. Obviously, sprockets and chains might be substituted for the pulleys and belts or, in some instances, a gear train might provide the driving connection between the motor spindle 23 and the input shaft 26 of the reducer 27. I presently prefer to use a Dodge torque arm reducer at 27.

Figure 3:
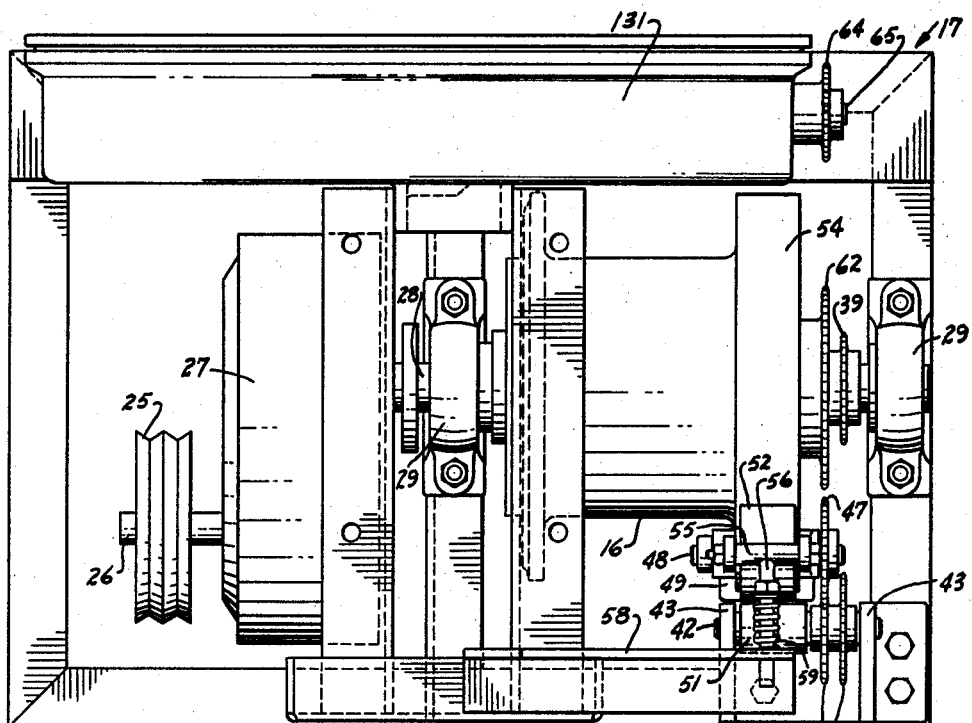
Fig. 3 is a plan view thereof, with the electric motor removed.

The output shaft of the reducer is suitably coupled to drive a shaft 28 (Figs. 3, 4 and 5) which is journalled in bearings 29, 29 for opposite rotation. The drum 16 includes end plates 30 and 31 which are respectively journal mounted on the shaft 28, through anti-friction bearings 32 and 33, so that the drum is coaxial with, and encloses a portion of, the shaft 28 from which it is supported.

A one-way clutch, indicated generally by the reference numeral 34, is housed within the drum 16 and comprises an input member 35 connected to rotate with the shaft 28, and an output member 36 connected to rotate with the drum 16. The clutch 34 includes conventional means for providing a driving connection between its input and output members when the shaft 28 rotates in one direction but to permit free rotation of the input member relative to the output member when the shaft 28 rotates in the opposite direction. As shown, a key 38 connects the clutch output member 36 with an internal rib 37 carried by the drum 16. Such a clutch may be of the type shown in U.S. Patent No. 2,748,912 to Banker.

Figure 2:
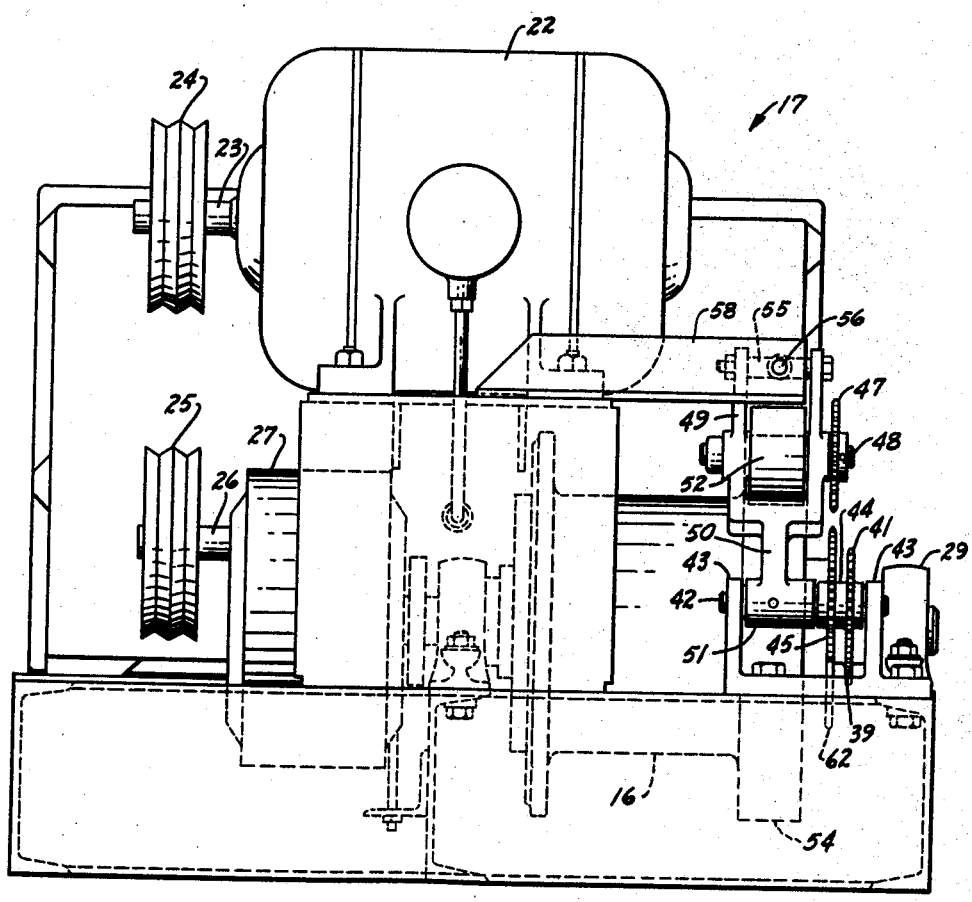
Fig. 2 is a side elevation of the winding and unwinding mechanism embodying the preferred form of my present invention.

Fixedly secured to rotate with the shaft 28, and outside the drum 16, is a sprocket 39 connected by a chain 40 (Fig. 4) to drive a sprocket 41 which is journal mounted on a rock shaft 42 supported in bearings 43, 43 (Fig. 2). As shown, the sprocket 41 is carried by a hub 44 which carries, as well, a sprocket 45 which is connected (Fig. 4) by a chain 46 to drive a sprocket 47. Sprocket 47 (Fig. 2) is fixed to a shaft 48 journalled in a yoke 49 formed on a rocker 50 which includes a hub 51 fixed to the rock shaft 42. Fixed to rotate with the shaft 48 between the arms of the yoke 49 is a friction roller 52. The drum 16 is formed to provide a flange 53 (Fig. 5) which presents an outwardly facing peripheral surface 54 registering with, and adapted to be engaged by, the roller 52.

At their distal ends, the arms of the yoke 49 are spanned by a rocker bar 55 to which is fixed a radially projecting pin 56 (Figs. 3 and 4) the distal end of which is guided, with a sloppy fit, in a port 57 formed in an upstanding, fixed bracket 58; and a coiled spring 59 is sleeved on the pin 56 and confined between the bracket 58 and an abutment nut 60 adjustably mounted on the pin 56.

It will be immediately apparent that, through this structure, the roller 52 is positively driven, at constant ratio, in the direction of rotation of the shaft 28, and is urged, with a force depending upon the calibration of the spring 59, into frictional engagement with the surface 54 of the flange 53 of the drum 16, to tend to drive the drum slowly in a direction opposite the direction of rotation of the shaft 28. For a reason which will become apparent as the description proceeds, the spring 59 is so designed and adjusted as to press the roller 52 only lightly against the surface 54, so that the slip-friction driving effect of the roller 52 upon the drum may be readily over-powered.

The end plate 31 of the drum 16 is formed to provide an elongated external hub 61 (Fig. 5) upon which is fixedly mounted a sprocket 62 which, through a chain 63 (Fig. 4) is connected to drive a sprocket 64 fixed to a shaft 65 which extends into a control housing 131. The shaft 65, through mechanism illustrated in Figs. 6 to 8, controls certain switching mechanism whereby the operation of the motor 22, to provide the above-outlined desirable results, is achieved.

Figure 9:
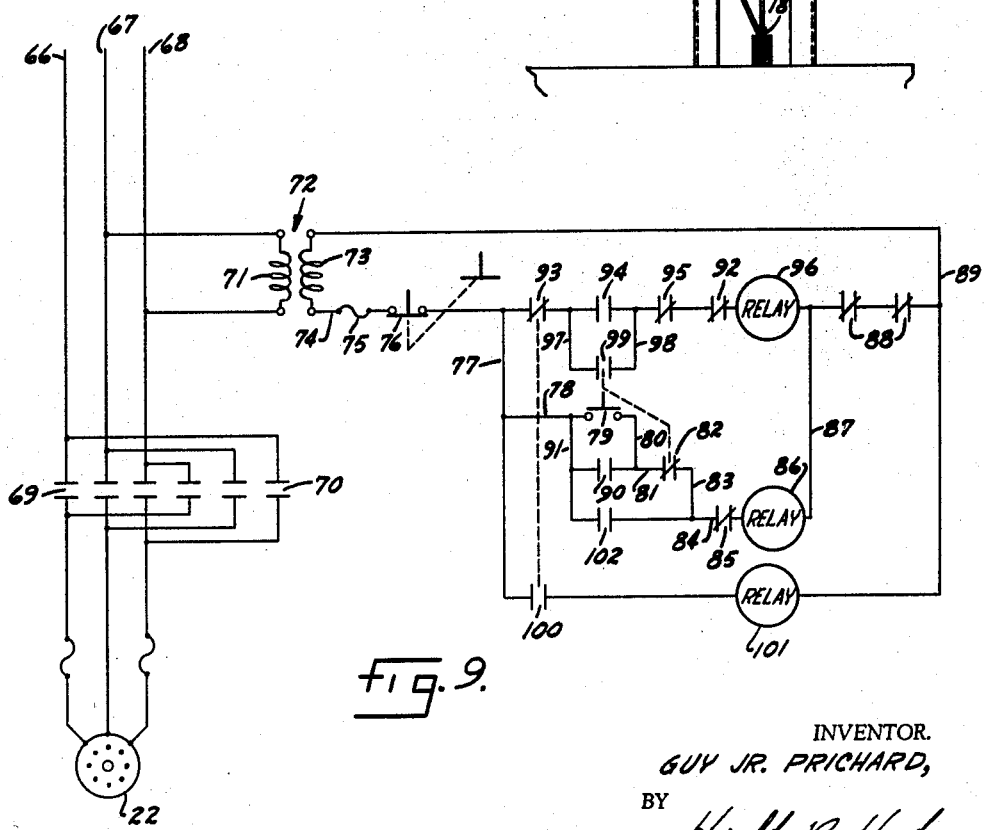
Fig. 9 is an elementary wiring diagram.

As is illustrated in the elementary wiring diagram of Fig. 9, a suitable source of electrical energy includes the line wires 66, 67 and 68 connected, through switch mechanism 69, to provide a forward energizing circuit for the motor 22 and, through switch mechanism 70, to provide a reverse energizing circuit therefor. The opposite ends of the primary winding 71 of a transformer 72 are connected, respectively, to line wires 67 and 68 to excite the secondary winding 73 of said transformer.

A wire 74 leads from one end of the winding 73 through a fuse 75 and a stop switch 76 to a wire 77 which is connected, by wire 78, to one terminal of a start switch 79, the other terminal of which is connected by wire 80 and wire 81 to normally closed limit switch 82 and thence, through wire 83 and wire 84 to normally closed switch 85 and relay 86. Wire 87 leads from relay 86 back to wire 74 and thence through overload switches 88 to wire 89 and back to the other terminal of the transformer winding 73. Thus, when switch 79 is momentarily closed, relay 86 will be energized. Energization of relay 86 closes normally open switch 90 which is connected, by wires 91 and 81, to by-pass the terminals of switch 79, thereby establishing a holding circuit for the relay 86. Energization of relay 86 also closes switch mechanism 70 and opens normally closed switch 92 in wire 74 to ensure against energization of relay 96 at a time when relay 86 is energized.

Beyond its junction with wire 77, wire 74 continues through normally closed switch 93, normally open switch 94, normally closed switch 95, normally closed switch 92 and relay 96 and thence through overload switches 88 to wire 89. A wire 97 leads from wire 74 to normally open switch 99, the other side of which is connected by wire 98 with wire 74 on the other side of normally open switch 94. Switches 82 and 99 are mechanically connected in such fashion that, whenever switch 82 is closed, switch 99 is open, and vice versa. Momentary opening of switch 82 will, of course, break the above-traced energizing circuit for relay 86 and will at the same time momentarily close switch 99 to establish an energizing circuit for relay 96 which may be traced from the coil 73 through wire 74, fuse 75, stop switch 76, normally closed switch 93, wire 97, momentarily closed switch 99, wire 98, normally closed switch 95, normally closed switch 92, relay 96, overload switches 88 and wire 89 back to the transformer coil. Energization of relay 96 closes normally open switch 94 to establish a holding circuit for the relay independent of the switch 99.

Energization of the relay 96 also closes switch mechanism 69 and opens normally closed switch 85 to guard positively against energization of the relay 86 at a time when the relay 96 is energized.

The wire 77 continues beyond its junction with the wire 78 to one side of a normally open switch 100, and thence from the other side of said switch through relay 101 to wire 89 and back to the transformer coil. Normally closed switch 93 is mechanically connected to normally open switch 100 so that, whenever switch 93 is closed switch 100 will be open, and vice versa. When switch 93 is opened, switch 100 will be closed to energize relay 101. Energization of relay 101 will open normally closed switch 95 to break the energizing circuit for the relay 96, and will close normally open switch 102 to establish a circuit, independent of the switches 79, 90 and 82, for the relay 86, which circuit may be traced from the transformer coil 73 through wire 74, fuse 75, switch 76, wire 77, switch 100, relay 101 and wire 89 back to the transformer coil.

Figure 8:
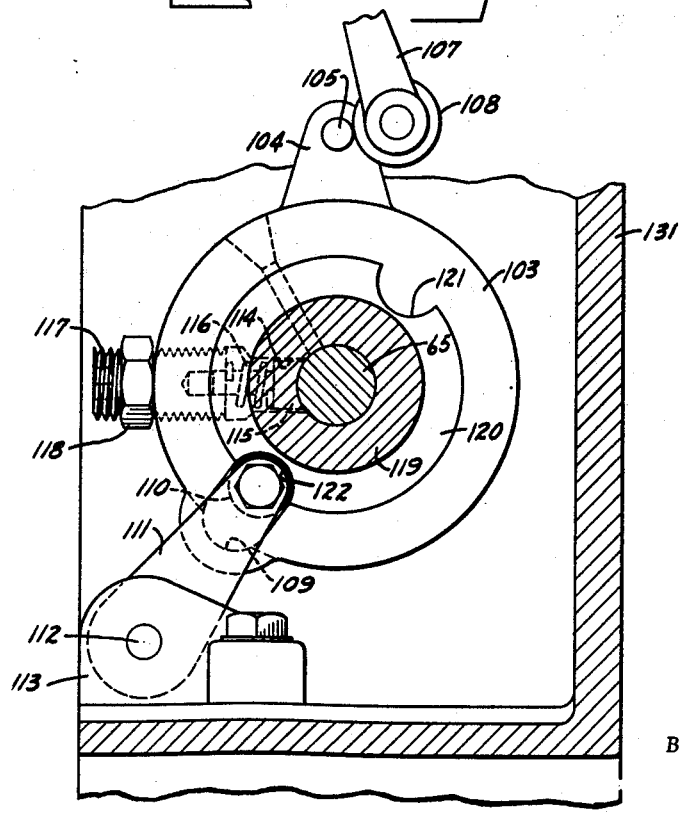
Fig. 8 is a section taken substantially on the line 8—8 of Fig. 7.
Figure 6:
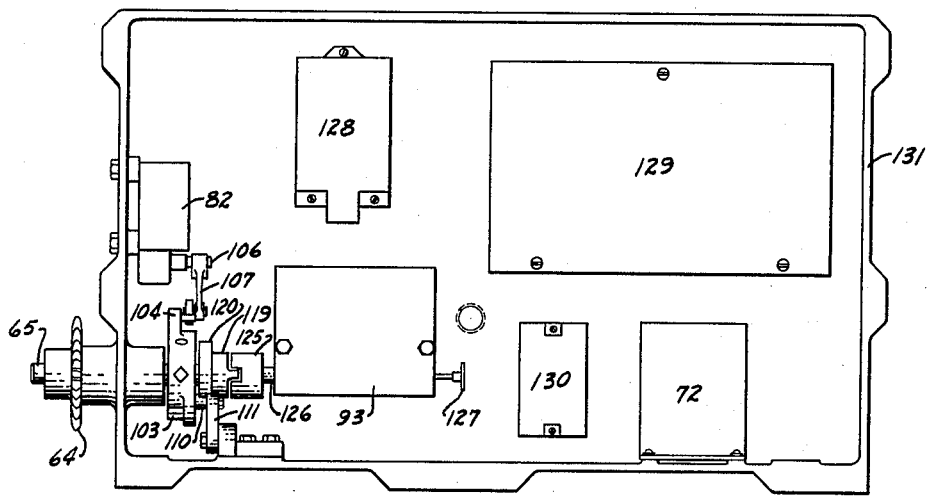
Fig. 6 is a side elevation of the control box and its contents, the cover being removed.
Figure 7:
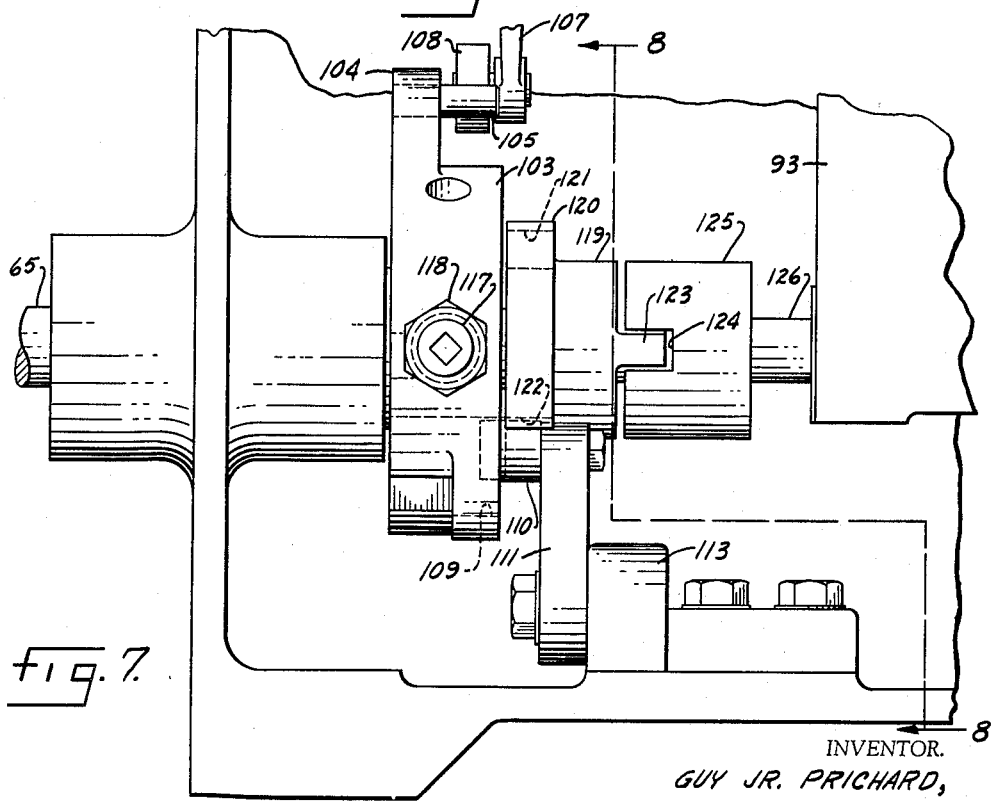
Fig. 7 is an enlarged fragmentary elevation showing certain of the parts illustrated in Fig. 6, in greater detail.

Referring, now, to Figs. 6 to 8, it will be seen that, within the control housing 131, the shaft 65 carries a disc 103 formed with a radially projecting finger 104 which carries a pin 105. The switch 82 (Figs. 6 and 9) includes an actuator shaft 106 upon which is fixedly mounted an arm 107 carrying a roller 108 disposed in the path of the pin 105. The disc 103 is further formed with a radially-extending slot 109 in which is operatively engaged a roller 110 projecting from a lever 111 oscillably mounted upon a rock shaft 112 supported in a block 113 fixed to the housing 131.

Within a radial bore 114 formed in the disc 103 there is reciprocably mounted a friction block 115 having a stem upon which is sleeved a spring 116 backed by a plug 117 adjustably threadedly mounted in the outer end of the bore 114. The plug 117 extends outside the bore 114 and there carries a jam nut 118. It will be seen that the block 115 thus provides a slip-friction driving connection between the shaft 65 and the disc 103, the frictional effect of which is adjustable by adjustment of the position of the plug 117. The switch 82, which is of conventional construction, is spring loaded to hold its arm 107 normally in a substantially vertical position, and when said arm is in such median position the switch 82 is closed and the switch 99 is open. Movement of the arm 107 in a counter clockwise direction as viewed in Fig. 8 opens switch 82 and closes switch 99. The plug 117 is so adjusted that the frictional effect of the block 115 is sufficient to carry the disc 103 with the shaft 65 in either direction so long as disc movement is unopposed, but is insufficient to overcome the spring load on the arm 107 to shift that arm 107 in either direction.

Rotationally fixed to the shaft 65 axially adjacent the disc 103 is a coupling member 119 formed with an enlarged flange 120 which, at one or more points in its periphery, is formed with notches such as those illustrated at 121 and 122 in Fig. 8. Those notches are proportioned, arranged and designed to receive the roller 110, at times when such notches come into registry therewith, in the manner illustrated in Fig. 8.

Normally, the lever 111 will stand in one or the other of its extreme positions, with the roller 110 located at the radially-outermost end of the slot 109 and the finger 104 displaced to one side or the other from its position illustrated in Fig. 8. If, for instance, the finger 104 is so displaced to the left, the shaft 65 may freely rotate in a counter clockwise direction without affecting the parts 103 and 111, since the roller 110, engaged in the slot 109, restrains the disc 103 against further counterclockwise movement. If, now the direction of rotation of the shaft 65 is reversed, the block 115 will tend to entrain the disc 103 in the clockwise movement, whereby the walls of the slot 109 will act on the roller 110 to press the same against the periphery of the flange 120, whereby clockwise rotation of the disc 103 will be stopped until one of the notches 121 or 122 comes into registry with the roller 110. Thereupon, by its engagement in such notch, the roller 110 will be positively carried along with the coupling member 119 until the roller 110, moving in a counter clockwise direction about the axis 112 of its lever 111, is withdrawn from the notch. The parts are so proportioned and designed that, as the roller travels during its engagement in the notch 121 or 122, carrying with it the disc 103 because of its engagement in the slot 109, the pin 105 will be moved through a sufficient angle to swing the arm 107 to the limit of its throw, and to pass by the roller 108, whereby the arm 107 may return to its median position. As the shaft 65 continues to rotate in a clockwise direction after escape of the roller 110 from the notch 121 or 122, the block 115 continues to urge the disc 103 to rotate with the shaft, thereby holding the roller 110 in the radially-outermost end of the slot 109.

Upon a subsequent reversal of the direction of rotation of the shaft 65, the roller 110 will again engage in one of the notches 121 or 122, in the same way, to carry the disc 103 in a counter clockwise direction to cause the pin 105 to swing the arm 107 momentarily to the opposite limit of its stroke and then to release the arm, whereby the arm returns to its median position under its own spring load.

The function accomplished by this actuation of the arm 107 will be explained hereinafter.

At its distal end, the coupling member 119 is arranged to provide a driving connection with a rotary limit switch. For instance, as shown in Fig. 7, the member 119 may be formed with a blade 123 operatively engaged in a transaxial slot 124 in a mating coupling member 125 fixed to a shaft 126. The shaft 126 is the actuating member of a conventional rotary limit switch indicated by the reference numeral 93 and so constructed and arranged that, whenever the shaft 126 occupies a preselected absolute position (which may be adjusted by manipulation of a control knob 127) the switch 93 will be open and the switch 100 (Fig. 9) will be closed; but whenever the shaft 126 is moved out of that absolute position, by no matter how many revolutions, the switch 93 will be closed and the switch 100 will be open.

As shown in Fig. 6, the control housing encloses, also, a control relay 128, a motor starter 129 and a terminal block 130, all of conventional design; but since these parts constitute no part of the present invention, they are neither illustrated nor described in detail.

*Operation*

Figure 4:
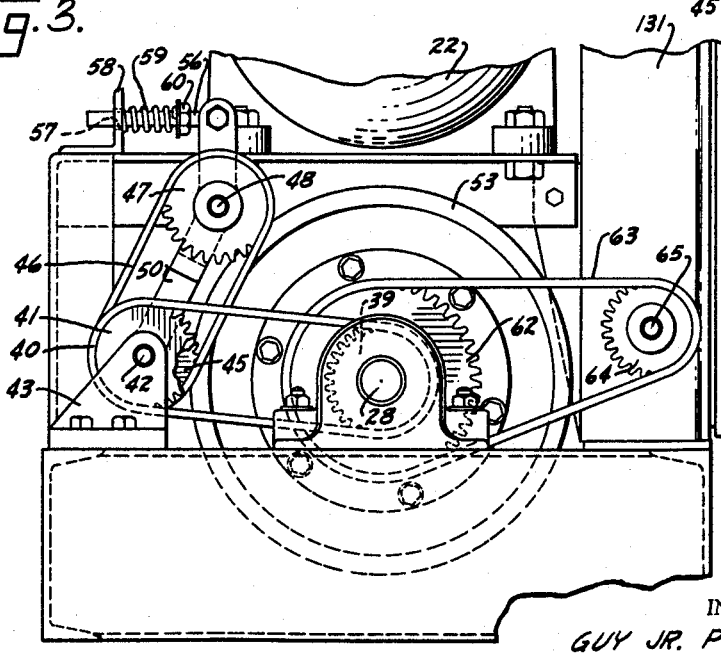
Fig. 4 is an end elevation thereof, the motor and a part of the control box being only fragmentarily illustrated.
Figure 5:
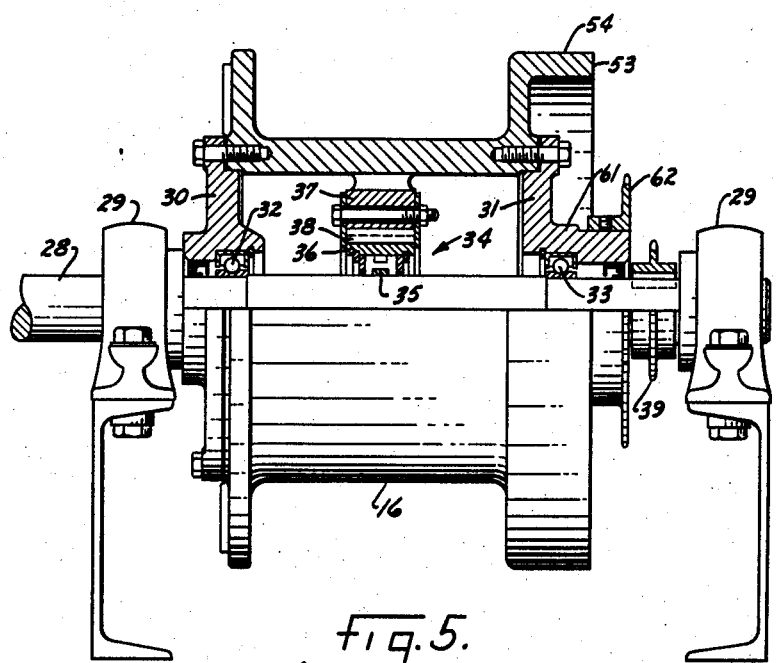
Fig. 5 is a somewhat enlarged side elevation of the winding drum and its associated parts, part of the drum being broken away to illustrate a one-way clutch housed therein.

When the device of the present disclosure is to be put into use, the link 20 is suitably supported within the car, the cable 15 being threaded from the drum, upon which a portion of its length is wound, around the sheave 18 and the sheave 19, and the start switch 79 is closed. As described above, this energizes relay 86 to close a holding circuit for the relay at the switch 90 and to close the switch mechanism 70 to energize the motor 22 to drive the shaft 28 in a direction opposite the strand winding direction; viz., clockwise as seen in Fig. 4. The arm 104, therefore, will occupy a position displaced to the left from that illustrated in Fig. 8. The shaft 28 will run freely with respect to the drum, since the one-way clutch 34 is designed to provide a driving connection between the shaft and the drum only when the shaft rotates in a counterclockwise direction, as viewed in Fig. 4.

Clockwise rotation of the shaft 28 drives the roller 52 in a clockwise direction, as viewed in Fig. 4, to urge the drum 16, through its slip friction connection therewith, toward counterclockwise, or strand-winding, rotation. As is explained above, however, the degree of friction with which the roller 52 engages the flange surface 54 is so slight that it may be readily over-powered by an operator grasping the handles of the scoop 14; and therefore the operator may draw the scoop 14 away from the drum 16, thereby rotating the drum in a clockwise direction as viewed in Fig. 4 against the tendency of the roller 52, to any desired position in the car 10.

When the operator has moved the scoop to a selected position, he will push it toward the sheave 19 with a force sufficient to produce a little slack in the strand 15. Since this removes all resistance against strand-winding rotation of the drum 16, the roller 52 will drive the drum, in a strand winding direction, far enough to take up the slack so provided in the strand.

Because of the ratio between the pitch diameters of the sprockets 62 and 64, a very slight movement of the drum is sufficient to turn the shaft 65 through at least 180° in a clockwise direction as viewed in Fig. 8. Thereby, as described above, the disc 103 will be moved in a clockwise direction and to a degree sufficient to swing the arm 107 to the right hand limit of its stroke and then to release the arm to permit it to return to its median position. Such movement of the arm 107 momentarily opens switch 82 to deenergize relay 86 and open switch mechanism 70, and momentarily to close switch 99 to energize relay 96 and close switch mechanism 69, thus reversing the direction of rotation of the shaft 28.

Immediately, the one-way clutch 34 establishes a driving connection between the shaft 28, which is now rotating in a counterclockwise direction as viewed in Fig. 4, and the drum 16, to drive said drum positively in a strand-winding direction to drag the scoop 14 toward the car doorway 11.

As the drum rotates, the shaft 65 continues to rotate, driving the shaft 126 of the rotary limit switch 93. By preliminary adjustment of the knob 127, that switch has been so conditioned that, when the drum 16 and the shaft 126 have been turned through enough rotations to bring the scoop 14 substantially to engagement with the sheave 19, the switch 93 will be opened and the switch 100 will be closed. Thereby, the relay 96 will be deenergized to open the switch mechanism 69, the relay 101 will be energized to close the switch 102, and the relay 86 will be energized through the switch 102 and switch 85 to reclose the switch mechanism 70, whereby the shaft 28 will again be driven in a clockwise direction, the clutch 34 will disengage and the scoop 14 will be returned to the control of the operator. Energization of relay 86 recloses switch 90 to establish a holding circuit for relay 86. As the operator again draws the scoop 14 away from the station 17, turning the drum 16 in a clockwise direction, the shaft 126 will be rotated to reopen the switch 100 and reclose the switch 93, whereby the system will be returned to starting condition. As the shaft 65 is again driven in a counterclockwise direction by unwinding rotation of the drum 16, the pin 105 will be returned to its starting position, displaced to the left from the position illustrated in Fig. 8, in the manner above described. Switch 82 is so constructed and wired that actuation of arm 107 by such return movement of pin 105 leaves switches 82 and 99 unaffected.

It will thus be seen that I have provided extremely simple, inexpensive and automatically-operating mechanism whereby a scoop may readily be manually moved to any desired position within a chamber to be unloaded, may then be power-actuated to a preselected position with respect to a winding drum, and will there be disconnected from the power means, all through the simple expedients of dragging the scoop manually away from the winding station and then moving it manually toward the winding station to a degree only sufficient to produce a little slack in the pulling strand.

I claim as my invention:

1. In a device of the class described, a winding drum, a pulling strand wound on said drum, reversible power means, one-way clutch means operable, when said power means operates in one direction, to connect said power means to drive said drum in a strand-winding direction but incapable of transmitting power from said power means to said drum when said power means operates in the opposite direction, means effective, when said power means is operating in said opposite direction, to urge said drum in a strand-winding direction with a force which may readily be overpowered by a manually-applied unwinding tension on said strand, said last-named means acting to turn said drum in a strand-winding direction when there is slack in said strand, and means actuated by such turning of said drum to reverse the direction of operation of said power means.

2. In a device of the class described, a winding drum, a pulling strand wound on said drum, a reversible power source, one-way clutch means providing a strand-winding driving connection between said power source and said drum only when said power source operates in one direction, slip-friction means providing a strand-winding driving connection between said power source, and said drum when said power source operates in the opposite direction, said slip-friction means being capable of being overpowered by a manual unwinding force applied to said strand, and means actuated upon the release of resistance to strand-winding rotation of said drum during operation of said power source in said opposite direction, to reverse the direction of operation of said power source.

3. In a device of the class described, a winding drum mounted for opposite rotation about its axis, a pulling strand adapted to be unwound from said drum upon drum rotation in one direction and to be wound onto said drum upon drum rotation in the opposite direction, a shaft mounted for opposite rotation about its axis, one-way clutch means connected between said shaft and said drum to provide a strand-winding connection therebetween only when said shaft rotates in a first direction, power means for driving said shaft selectively in said first direction or in the opposite direction, slip-friction means driven from said power means to drive said drum in a strand-winding direction when said shaft rotates in said opposite direction, and means actuated by drum rotation in a strand-winding direction during rotation of said shaft in said opposite direction to reverse the direction in which said shaft is driven by said power means.

4. The device of claim 1 including other reversing means, activated by strand-unwinding rotation of said drum from a predetermined absolute position and effective, upon return of said drum to such predetermined position, to restore operation of said power means to said opposite direction.

5. In a device of the class described, a winding drum, a pulling strand wound on said drum, a reversible electric motor having a spindle, a one-way clutch comprising an input element driven from the spindle of said motor, an output element connected to rotate with said drum, and means establishing a driving connection from said input element to said output element only when said spindle is rotating in a first direction, to drive said drum positively in a strand-winding direction, slip-friction means driven by said motor and effective, when said motor spindle is rotating in the opposite direction, to apply a readily-overpowered driving force to said drum in a strand-winding direction, a first energizing circuit for said motor acting, when energized, to drive said spindle in said first direction, a second energizing circuit for said motor acting, when energized, to drive said spindle in said opposite direction, reversing switch means dominating said circuits, and means actuated by strand-winding movement of said drum while said second circuit is energized to shift said switch means to deenergize said second circuit and energize said first circuit.

6. In a device of the class described, a winding drum, a pulling strand wound on said drum, a reversible electric motor having a spindle, a one-way clutch comprising an input element driven from the spindle of said motor, an output element connected to rotate with said drum, and means establishing a driving connection from said input element to said output element only when said spindle is rotating in a first direction, to drive said drum positively in a strand-winding direction, slip-friction means driven by said motor and effective, when said motor spindle is rotating in the opposite direction, to apply a readily-overpowered driving force to said drum in a strand-winding direction, a first energizing circuit for said motor acting, when energized, to drive said spindle in said first direction, a second energizing circuit for said motor acting, when energized, to drive said spindle in said opposite direction, reversing switch means dominating said circuits, means actuated by strand-winding movement of said drum while said second circuit is energized to shift said switch means to deenergize said second circuit and energize said first circuit, and further switch means including an element moving in constant ratio to said drum and effective, whenever a preselected point on said strand reaches a predetermined position relative to said drum during strand-winding rotation of said drum, to deenergize said first circuit and energize said second circuit.

7. In a device of the class described, a shaft, means for driving said shaft selectively in opposite directions, a winding drum coaxial with said shaft, enveloping a portion of said shaft and mounted for opposite rotation, a pulling strand wound on said drum, one-way clutch means located within said drum and effective, when said shaft is driven in a first direction only, to establish a positive driving connection between said shaft and said drum, said drum being provided with an exposed, annular surface, a driving element yieldably urged into frictional engagement with said annular surface, means connecting said driving means to drive said driving element in a direction to urge said drum toward strand-winding rotation when said shaft is driven in a direction opposite said first direction, and means actuated by turning movement of said drum in a strand-winding direction under the influence of said driving element to reverse the direction of rotation of said shaft.

8. In a device of the class described, a first shaft, means for driving said first shaft selectively in opposite directions, a drum coaxial with, and enveloping a part of, said shaft, a pulling strand wound on said drum, a one-way clutch housed within said drum and comprising an input element fixed to said shaft, an output element mounted to rotate with said drum, and means establishing a driving connection from said input element to said output element only upon rotation of said shaft in a first direction, said drum being provided with an exposed peripheral surface, a second shaft mounted on an axis spaced from the axis of said first shaft, a rocker mounted for oscillation about the axis of said second shaft, a rotatable friction element carried by said rocker at a point removed from the axis of said second shaft and movable, upon oscillation of said rocker, into and out of frictional engagement with said exposed drum surface, means providing a driving connection between said first shaft and said second shaft and means providing a driving connection between said second shaft and said friction element to drive said friction element in a direction such as to exert upon said exposed drum surface, when said friction element is in engagement therewith, a force tending to turn said drum in a direction opposite the direction of rotation of said first shaft, and spring means operatively associated with said rocker and resiliently urging said friction element toward engagement with said exposed drum surface.

9. In a device of the class described, a first shaft, means for driving said first shaft selectively in opposite directions, a drum coaxial with, and enveloping a part of, said shaft, a pulling strand wound on said drum, a one-way clutch housed within said drum and comprising an input element fixed to said shaft, an output element mounted to rotate with said drum, and means establishng a driving connection from said input element to said output element only upon rotation of said shaft in a first direction, said drum being provided with an exposed external peripheral surface, a second shaft mounted on an axis parallel with but spaced from the axis of said first shaft, a rocker mounted for oscillation about the axis of said second shaft, a rotatable friction element carried by said rocker at a point removed from the axis of said second shaft and movable, upon oscillation of said rocker, toward and away from the axis of said first shaft to establish an easily-overpowered frictional driving engagement with said drum surface, wheel means fixed to rotate with said first shaft, wheel means fixed to rotate with said second shaft, endless means providing a driving connection between said wheel means, other wheel means fixed to rotate with said second shaft, further wheel means fixed to rotate with said friction element, endless means providing a driving connection between said other wheel means and said further wheel means, and spring means operatively associated with said rocker and resiliently urging said friction element toward engagement with said exposed drum surface.

10. The device of claim 8 including a third shaft, means providing a driving connection between said drum and said third shaft, and means carried by said third shaft and effective, whenever said drum turns in a strand-winding direction while said first shaft is being driven in a direction opposite said first direction, to reverse the direction of rotation of said first shaft.

11. The device of claim 8 including a third shaft, means providing a driving connection between said drum and said third shaft, means carried by said third shaft and effective, whenever said drum turns in a strand-winding direction while said first shaft is being driven in a direction opposite said first direction, to reverse the direction of rotation of said first shaft, and other means driven from said third shaft and effective, whenever a predetermined point on said strand reaches a preselected position relative to said drum during rotation of said first shaft in said first direction, to reverse the direction of rotation of said first shaft.

12. The device of claim 8 in which said driving means for said first shaft is a reversible electric motor, said device including a third shaft, a limit switch effective, when tripped during rotation of said first shaft in a direction opposite said first direction, to reverse the direction of operation of said motor, and means moving with said third shaft to trip said limit switch whenever said drum turns in a strand-winding direction during such rotation of said first shaft in such opposite direction.

13. In a drag-scoop assembly, a winding drum mounted for reverse rotation on a fixed axis, a pulling strand operatively connected to said drum and adapted to be wound onto, and unwound from, said drum to varying degrees, a scoop fixed to the free end of said strand, a continuously-operating, rotary, reversible power source, means including a one-way clutch capable of establishing a driving connection between said power source and said drum in a strand-winding direction only and freeing said drum for strand-winding rotation under a strand-unwinding force manually applied to said scoop when said power source is rotating in the opposite direction, and means driven by rotation of said power source in said opposite direction and acting automatically when slack is provided in said strand between said scoop and said drum during rotation of said power source in said opposite direction, to reverse the direction of rotation of said power source.

References Cited in the file of this patent

UNITED STATES PATENTS

| | | |
|---|---|---|
| Re. 24,201 | Addicks | Aug. 28, 1956 |
| 2,250,985 | Benson | July 29, 1941 |
| 2,620,161 | Royer | Dec. 2, 1952 |
| 2,631,818 | Whitney | Mar. 17, 1953 |
| 2,675,991 | Waterstreet | Apr. 20, 1954 |
| 2,709,068 | Waterstreet | May 24, 1955 |